US006990079B2

(12) United States Patent
Vrabel

(10) Patent No.: US 6,990,079 B2
(45) Date of Patent: Jan. 24, 2006

(54) OPTIMIZING FRAGMENT SIZES IN FRAME RELAY NETWORKS

(75) Inventor: Robert Andrew Vrabel, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 847 days.

(21) Appl. No.: 09/877,289

(22) Filed: Jun. 8, 2001

(65) Prior Publication Data

US 2004/0202191 A1    Oct. 14, 2004

(51) Int. Cl.
*H04L 12/26*    (2006.01)
(52) U.S. Cl. .................. 370/252; 370/412; 370/468
(58) Field of Classification Search ............ 370/230.1, 370/252, 412, 468, 474, 477
See application file for complete search history.

(56) References Cited

U.S. PATENT DOCUMENTS

| 5,303,237 A | 4/1994 | Bergman et al. .......... 370/85.6 |
| 5,448,564 A | 9/1995 | Thor ...................... 370/94.1 |
| 5,490,141 A | 2/1996 | Lai et al. .................. 370/60.1 |
| 5,519,640 A | 5/1996 | Ganesan et al. .......... 364/514 R |
| 5,781,532 A | 7/1998 | Watt ......................... 370/236 |
| 5,812,545 A * | 9/1998 | Liebowitz et al. .......... 370/468 |
| 5,883,893 A | 3/1999 | Rumer et al. ............... 370/395 |
| 5,936,948 A | 8/1999 | Sicher ....................... 370/314 |
| 6,570,849 B1 * | 5/2003 | Skemer et al. ........... 370/230.1 |

OTHER PUBLICATIONS

Cut-Through Switch for Frame Relay Networks, IBM Technical Disclosure Bulletin, vol. 32, No. 9A, Feb. 1990, pp. 483-487.
On the Fly Bandwidth Reservation Control, IBM Disclosure Bulletin, vol. 40, No. 11, Nov. 1997, pp. 53-55.

* cited by examiner

*Primary Examiner*—Duc Ho
*Assistant Examiner*—Phuongchau Ba Nguyen

(57) ABSTRACT

Fragmentation of non-realtime data for transmission in frame relay networks is sized dynamically according to available bandwidth. The bandwidth is determined according to burst interval and burst size calculations based on parameters including the amount and type of realtime data to be sent and the percentage of burst interval utilized by the realtime data. If no realtime data is being sent, then the fragment sizes of the non-realtime data are adjusted to utilize the entire available bandwidth.

2 Claims, 3 Drawing Sheets

OPTIMIZING FRAGMENT SIZES IN FRAME RELAY NETWORKS

BACKGROUND OF THE INVENTION

1. Field of the Invention

This invention relates to the transmission of data via frame relay networks. Particularly, it relates to fragmenting data packets to be transmitted over a frame relay network and more particularly, it relates to dynamically determining optimum fragment sizes.

2. Description of the Related Art

When transmitting realtime and non-realtime data over the same frame relay serial interface, frame relay fragmentation is required. The frame relay implementation agreements call for fixed fragment sizes only. This convention fails to take advantage of the full bandwidth of a system.

Most layer 3 protocols such as SNA (System Network Architecture) and IP (Internet Protocol) and some layer 2 protocols such as PPP (Point-to-Point) and FR (Frame Relay) support fragmentation but they do not dynamically set the fragment sizes to maximize bandwidth utilization.

BRIEF SUMMARY OF THE INVENTION

To reduce the delays in real time traffic, which generally consists of many relatively small packets, large data packets are fragmented into smaller packets, and the realtime packets are interleaved between the fragments of the data frame. This minimizes the delay in the receipt of the realtime traffic. Using dynamically determined fragment sizes when fragmenting the larger data packets reduces the amount of overhead associated with fragmentation, maximizes the amount of bandwidth used, and greatly reduces the complexity of determining the optimum fragment size.

According to the invention, data fragmentation in a frame relay network makes efficient use of bandwidth by maintaining separate queues to store realtime data and non-realtime data to be transmitted. Also, a fragment queue is implemented to hold fragments of data to be transmitted. The queues are checked in a sequence to determine first whether the realtime data queue is empty. If so, then the non-realtime data queue is checked for data to be transmitted. Existing realtime data is transmitted in successive packets when the realtime data queue is not empty. The non-realtime data is fragmented dynamically according to available transmission bandwidth.

BRIEF DESCRIPTION OF THE DRAWING

The invention is described in detail by referring to the various figures which illustrate specific embodiments of the invention, and wherein like numerals refer to like elements.

DETAILED DESCRIPTION OF THE INVENTION

There is an industry-wide de facto standard for fragmenting and reassembling data frames transmitted and received over circuits in a frame relay network. (FRF.12 Frame Relay Forum implementation agreement is an example.) Fragmentation is necessary when a typically low speed serial link is used to carry both realtime and non-realtime data concurrently. Examples of data types include VoFR (Voice over Frame Relay), VoIP (Voice over IP) traffic, and IP FTP (File Transfer Protocol) transactions.

To minimize delay of realtime traffic, which usually comprises many small data packets, large data packets are fragmented into smaller packets. Then the realtime packets are interleaved between the fragments of the data frame. This reduces delays in the receipt of the realtime traffic. The burden is on the frame relay layer in the receiving device to reassemble the fragmented packets and forward them to the appropriate higher layer. The current industry standard calls for using fixed data fragment sizes.

Implementing dynamic fragments is more efficient because it reduces the amount of overhead associated with fragmentation by reducing the number of fragments to be transmitted. It also optimizes the utilization of circuit bandwidth by dynamically varying the fragment sizes so as to utilize as much of the available bandwidth as possible. In addition, it greatly reduces the complexity of configuring fragment sizes for frame relay circuits.

Fragmentation is required for all circuits, i.e., end points, in a serial interface that will be used for voice and other high priority, realtime (time sensitive) data. Fragmentation is necessary to minimize the delay in queuing and transmitting voice packets and should be used for all circuits that exchange data over a link supporting voice transmission.

Fragment sizes may vary among frame relay interfaces depending on the access speed of the link, the CIR (Committed Information Rate) of the circuit, and whether a link is actually carrying voice or communicating with another router having a voice-carrying interface. Fragment sizes are not negotiated or communicated among circuits. Therefore, they may be different for two interconnected circuits. Because of the overhead associated with fragmentation, it is more efficacious to keep the size of fragments as large as possible while maintaining high quality voice communications. It is important that the round trip response time for a voice packet not exceed 250 milliseconds. Otherwise, both sides of the conversation will overlap one another. Therefore, every component in a network must minimize its portion of the delay while maximizing its efficiency.

Figure 1:
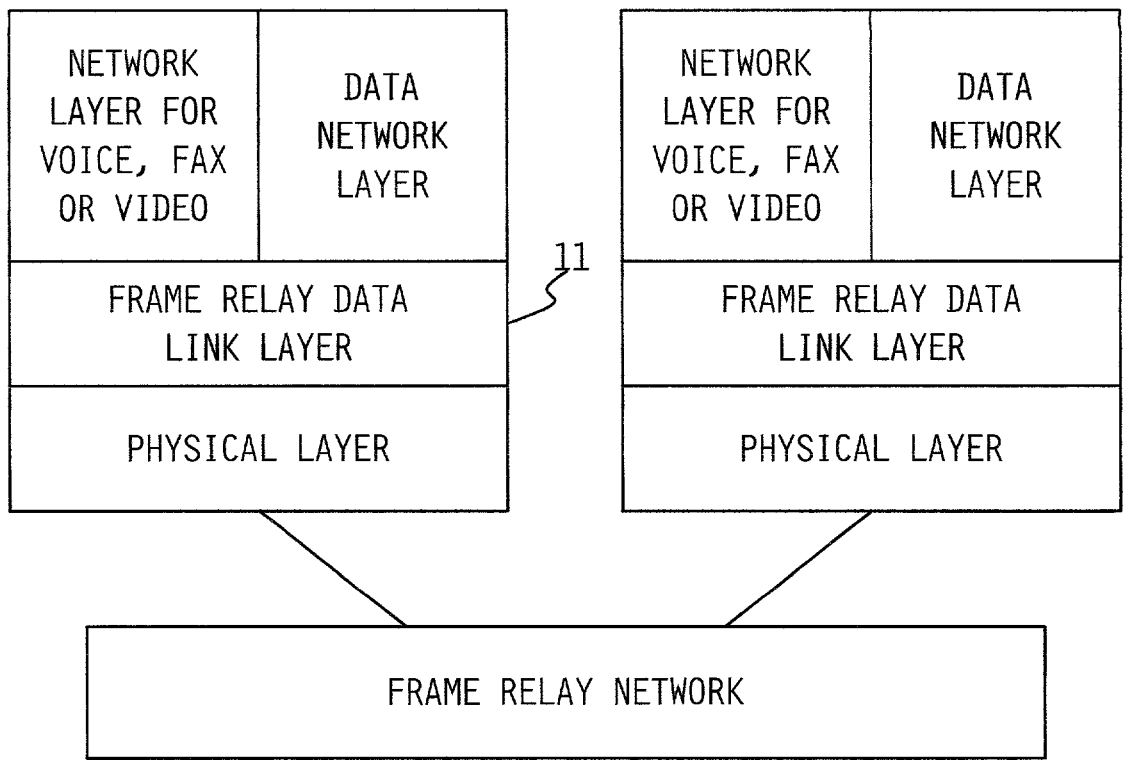
FIG. 1 is a block diagram of the environment in which the invention is useful.
Figure 2:
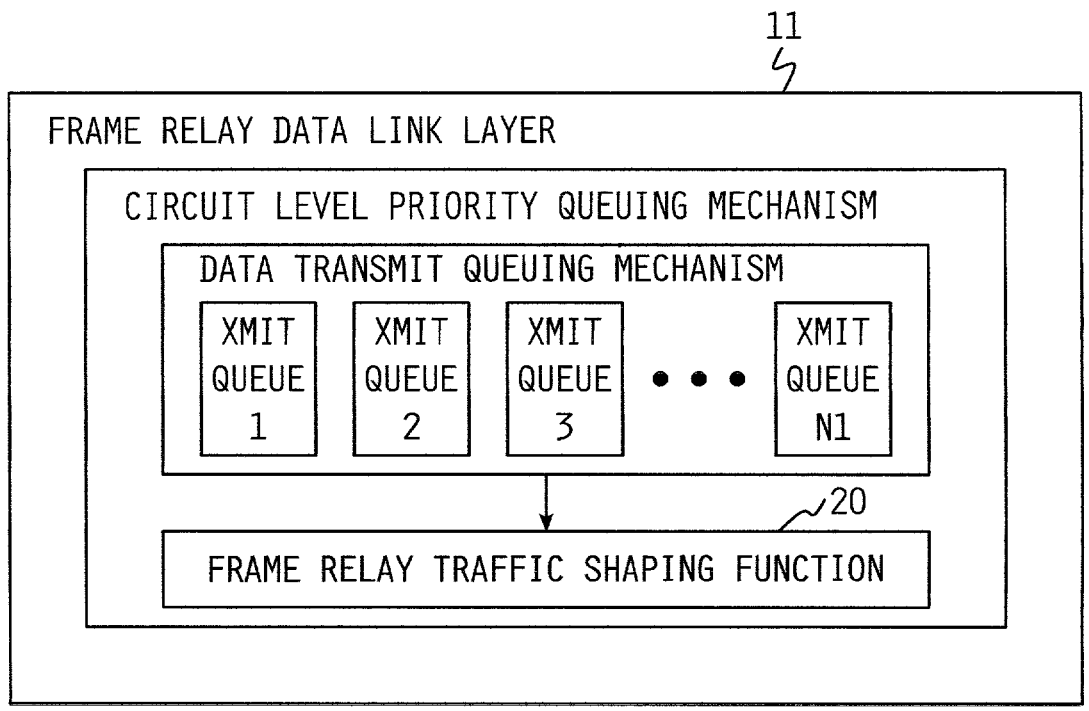
FIG. 2 is a block diagram of components of the frame relay data link layer of FIG. 1 including a frame relay traffic shaping function according to the invention.

FIG. 1 shows an environment in which the invention is useful. The components are well known in the art. FIG. 2 illustrates the position of the frame relay data link layer 11 of FIG. 1 in relation to the communications system in which it is used. In FIG. 2, a frame relay traffic shaping function 20 incorporating the invention is included as part of the circuit level priority queuing mechanism.

To support both realtime and non-realtime traffic over the same link, the invention utilizes three queues: one for realtime data, one for non-realtime data, and a fragment queue. These queues are always checked in the following order at each opportunity to transmit data: first, the realtime data queue; second, the fragment queue; and third, the non-realtime data queue. If data to be transmitted is found in the queue when it is checked, it is serviced without checking the contents of the other queues. If the queue is empty, the next queue is checked.

Figure 3:
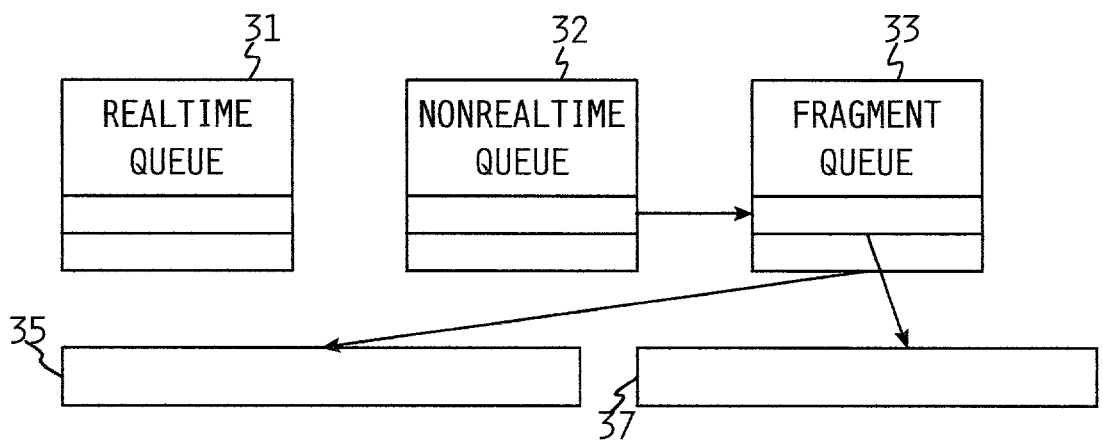
FIG. 3 is an illustration of transmissions for non-realtime data only.

FIG. 3 illustrates a situation in which only non-realtime data is being transmitted. Frames are removed from the non-realtime queue 32 one at a time. The optimum fragment size is determined based on the amount of bandwidth available in the current burst window and the resulting data is sent as represented by a packet 35. Remaining data is placed on the fragment queue 33. When the next opening to send data arises, data is taken from the fragment queue 33. The optimum fragment size is again calculated and this is transmitted as packet 37. The sizes of packets 35 and 37 depend on the burst interval and the burst size.

Figure 4:
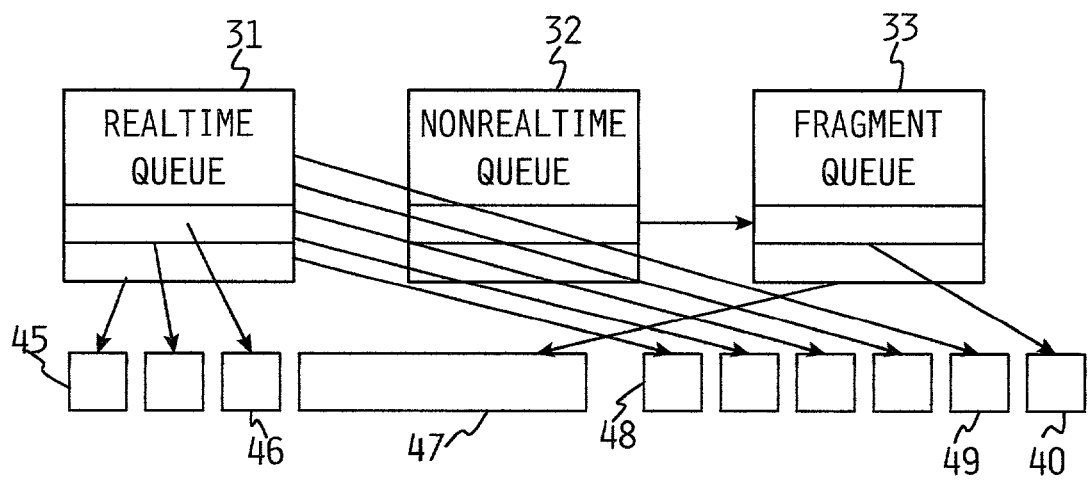
FIG. 4 is an illustration of transmissions for combinations of realtime and non-realtime data.

In FIG. 4, the situation in which both realtime and non-realtime data are being transmitted is shown. Realtime data is taken from the realtime queue 31 and transmitted as packets 45 to 46. When the realtime queue 31 is empty, a frame is taken from the non-realtime queue. The optimum fragment size is determined based on the amount of bandwidth available in the current burst window and a fragment 47 is transmitted. Remaining data is placed on the fragment queue 33.

When the next opening to send data arises, data is taken from the realtime queue 31 and sent as packets 48 to 49. Data is then taken from the fragment queue 33, the optimum queue size is again calculated, and send as a packet 40.

At The fragment size is determined at each transmission occasion to maximize the use of the available bandwidth. The packets 45 to 46 together with the fragment 47 comprise a burst such as the burst interval of the packet 35 in FIG. 3. Similarly, the packets 48 to 49 together with the fragment 40 are analogous to the burst interval of the fragment 37 of FIG. 3.

The burst size and the burst interval are important when multiplexing voice and data over the same circuit to reduce the delay of the voice packets. The burst interval, Tc, is calculated as Bc/CIR, i.e., the committed burst interval divided by CIR. This determines the duration of the burst. The burst size is the number of bits the circuit is configured to send during the burst interval Tc and is calculated as Bc+Be (the committed burst plus the excess burst). Typical values for a circuit on a T1 link with a CIR of 64 Kbs (kilobits per second) might be a Bc of 64 Kb, and a Be of 0 results in a Tc of 1 second. Such a circuit will burst up to 64 Kb during a one-second period. If there is data queued for the circuit, then the 64 Kb will be sent at the beginning of the interval. The frame relay device must then wait for the next Tc, i.e., the next second, before it can send more data. This works well for file transfers and also for voice only since a voice adapter will send data to the frame relay link at a steady and predictable rate, eliminating the burst. When the circuit is handling a combination of voice and data traffic, the voice traffic could be queued for up to one second waiting for the next Tc interval. This exceeds the 250 milliseconds allowable maximum.

In the case of combined voice and data traffic, the fragment size should be adjusted as should the CIR and burst size to accommodate the combination of voice and data. The parameters include access rate of the link, the maximum number of expected calls to be carried concurrently, and the vocoder's (voice adapter) sampling and compression rate. A 60-millisecond delay in the voice traffic at the frame relay link has been found to be acceptable for voice communication. Thus, the burst interval, Tc, should be set to 60 milliseconds. With a CIR of 64 Kbps, setting Bc to 3840 bits results in a Tc interval of 60 milliseconds. Thus, the circuit can send 480 bytes (3840 bits) per each 60 millisecond burst interval. This provides a transmission rate of 8 KBps (kilobytes per second or 64 Kbps).

For example, if there are four voice calls to be carried concurrently and each call will generate one 25 byte frame every 15 milliseconds, then in a 60-millisecond interval, the voice ports will be transmitting 400 bytes per interval, i.e., 25 bytes×4 frames×4 calls per interval. This leaves 80 bytes per Tc interval to send data traffic. Therefore, the fragment size should be set to 74 bytes, viz., 80 bytes less 6 bytes of overhead.

If the maximum number of calls changes or the subscribed CIR is different from 64 Kbps, the values of Bc and the fragment size will be different. In the example, if the maximum number of voice calls changes from four to two for the circuit, the Tc interval will remain at 60 milliseconds so that Bc remains 3840 bits. The fragment size, however, will change because a larger fragment size is possible and can be sent in the same Tc interval with the voice packets. In this example, the fragment size would be set to 274 bytes (480−(25×4×2)−6).

The example shows that dynamic fragment sizes provide better implementation of the frame relay circuits because the overhead and number of fragments to be transmitted are reduced. If no voice calls are active, a steady stream of data traffic is being transmitted. With dynamic fragment sizing, the bandwidth utilized for overhead would be about seven bytes per Tc interval, one fragment header plus one HDLC boundary flag per transmission opportunity. With a fixed fragment size of 80 bytes, the overhead would amount to 42 bytes per Tc interval, one fragment header plus on HDLC boundary flag for six transmission opportunities. This would waste 6% of the bandwidth based on worst case of one or more active voice calls.

In the example with only one voice call active, a dynamic fragment size would use all the available bandwidth because the fragment size needed to fill each Tc exactly is calculated. Using a fixed fragment size of 80 bytes, 60 bytes per Tc interval would be wasted since the last full fragment would not fit in the current Tc interval. That is, 480 bytes per interval less 100 bytes of voice data leaves 380 bytes, which at 80 bytes per fragment, requires 4¾ fragments. Since partial fragments can not be transmitted, the amount of wasted bandwidth is 60 bytes (three-fourths of 80). In the example, this is 6% of the available bandwidth being wasted.

The fundamental consideration in optimizing link usage is to find the largest possible Tc interval to permit the largest possible fragment size consistent with good voice quality.

Figure 5:
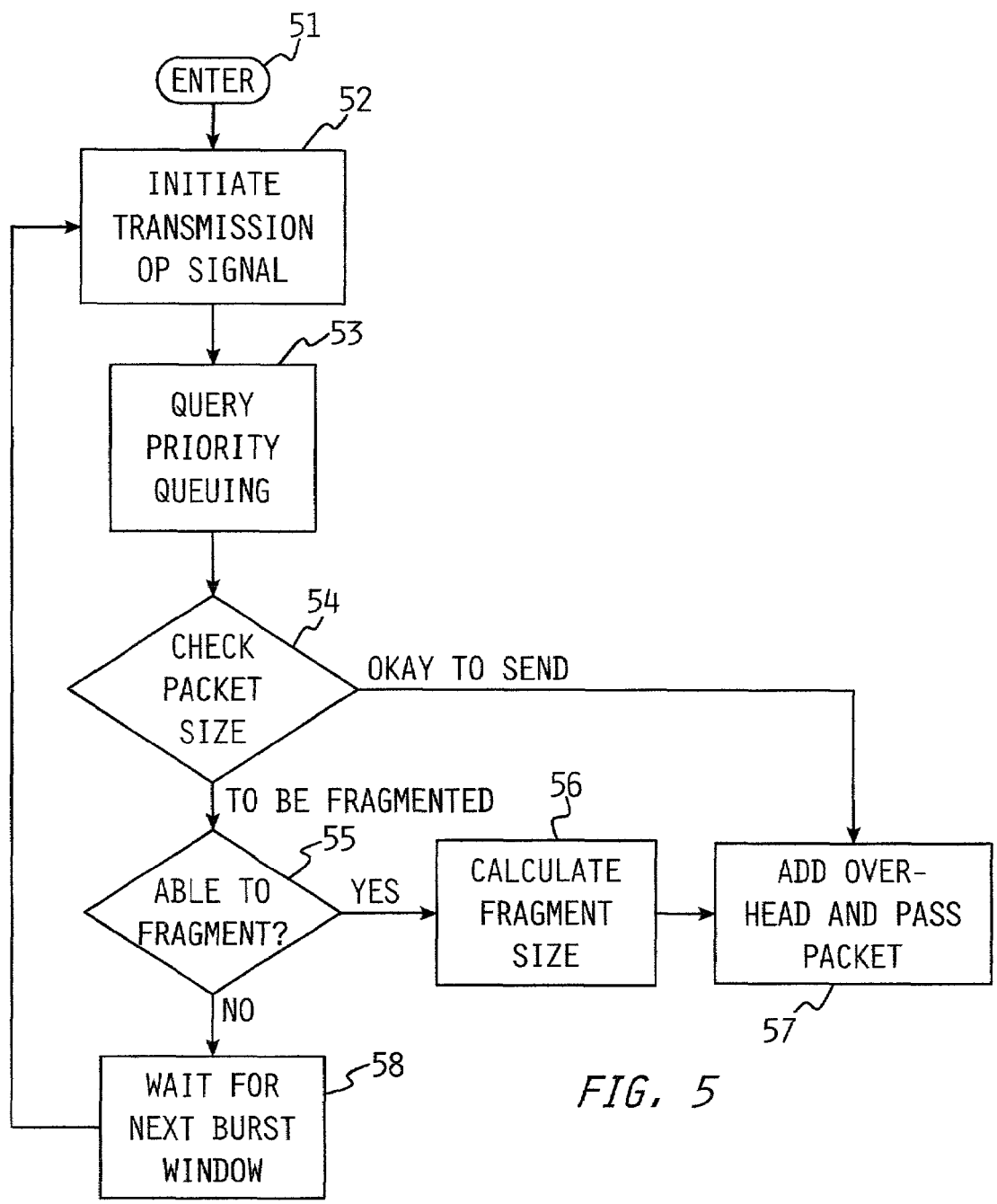
FIG. 5 is a flowchart of a process according to the invention.

In the following description, references are made to the flowchart of FIG. 5 depicting the sequence of operations executable by a computer program. The symbols used are standard flowchart symbols recommended by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular system used to implement the invention. Different processors have different instruction sets, but persons of ordinary skill in the art are familiar with the instruction sets with which they work and can implement the operations set forth in the blocks of the flowchart.

FIG. 5 is a flowchart of the procedure according to the invention. The procedure is entered at a terminal symbol 51. Next, by a process block 52, a transmit operate signal is initiated.

By a process block 53, the priority queuing mechanism is checked for the next packet to be transmitted. The process block 53 returns a packet from the highest priority non-empty queue. The queues are always searched in the order of realtime queue first, fragment queue next, and non-realtime queue last.

A decision block 54 determines whether a returned packet can be sent without being fragmented by comparing the packet size to the current bandwidth available in the current burst window. If the current burst window is able to handle the entire packet, the fragmentation header is added as though the packet came from the fragment queue. It is then transmitted by process block 57.

A decision block 55 determines whether the returned packet can be fragmented. Packets from the realtime queue can not be fragmented. If the frame is from the realtime queue, it is placed back on the realtime queue and processing is deferred until the beginning of the next burst window in a process block 58.

If the packet can be fragmented, the fragment size is determined by a process block 56 as the working burst size less the size of the overhead and the fragment data is moved to the transmit buffer. The remaining packet data is transferred to the fragment queue. Then the procedure continues at the process block 57.

If the packet cannot be fragmented, then a process block 58 determines when the next burst interval, Tc, begins. A delay timer is set to initiate the transmit operation at the start of the next interval.

The goal of fragmentation is to prevent queuing small realtime packets for even a short period of time. Bandwidth will be wasted if the fragment sizes are not optimal. The fragment size may vary because of the changing nature of the realtime traffic. For example, if VoFR data is being multiplexed with non-realtime data, the fragment size will vary for a given circuit depending on the number of active calls. If no calls are active, the entire burst interval can be devoted to data fragments. As the number of calls varies, the fragment size will be the number of bytes per Tc interval less the number of bytes needed for each active call.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method in a frame relay transmission to make efficient use of bandwidth comprising:
   maintaining separate queues to store realtime data and non-realtime data to be transmitted;
   providing a fragment queue to hold fragments of data to be transmitted;
   checking in order to determine whether the realtime data queue and then the non-realtime data queue is empty;
   transmitting realtime data in successive packets when the realtime data queue is not empty;
   fragmenting non-realtime data dynamically according to available transmission bandwidth including determining fragment sizes according to available burst intervals; and
   transferring fragmented non-realtime data to the fragment queue for transmission after transmission of realtime data:
   setting values for a maximum number of expected voice calls, for access rates of link devices within the system, for voice sampling and compression rates, and for acceptable voice traffic delays;
   ascertaining a burst interval based on the acceptable voice traffic delays value;
   calculating a value of a committed burst size based on the burst interval divided by the access rates of link devices; and
   computing a fragment size according to the committed burst size less overhead and size of voice fragments.

2. A data transmission system for optimal utilization of bandwidth comprising:
   a frame relay data link layer for coupling data to be transmitted to the data transmission system;
   a queuing mechanism for controlling a plurality of data queues including a realtime data queue, a non-realtime data queue, and a fragment queue;
   a circuit level priority queuing mechanism for interfacing the queuing mechanism to the frame relay data link layer;
   a frame relay traffic shaping device for preparing data fragments to be transmitted including
   calculating means responsive to system parameters for supplying size information to the transfer means by dynamically determining an optimum fragment size;
   testing means arranged to test whether the realtime data queue contains data to be transmitted;
   coupling means to transmit contents of said realtime data queue in response to a nonempty signal from the testing means;
   transfer means connected relative to the non-realtime data queue and the fragment queue for moving fragments of data from the non-realtime data queue to the fragment queue including means responsive to the frame relay traffic shaping device for determining the size of data fragments to be moved from the non-realtime data queue to the fragment queue;
   said calculating means including data supplying means providing parameters including a maximum volume of expected realtime data and data access rates of devices within said system;
   computation means responsive to the data supplying means for calculating a fragment size to utilize all available bandwidth in the system; and
   output means for supplying the fragment size to the transfer means.

* * * * *